US010195666B1

(12) United States Patent
Barnet et al.

(10) Patent No.: US 10,195,666 B1
(45) Date of Patent: Feb. 5, 2019

(54) METHOD OF 3D PRINTING WITH FINISHING TOOL

(71) Applicant: Amazon Technologies, Inc., Seattle, WA (US)

(72) Inventors: Aaron Takayanagi Barnet, Seattle, WA (US); Nancy Yi Liang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 545 days.

(21) Appl. No.: 14/853,847

(22) Filed: Sep. 14, 2015

(51) Int. Cl.
| | |
|---|---|
| *B29C 59/02* | (2006.01) |
| *B22F 3/24* | (2006.01) |
| *B22F 3/105* | (2006.01) |
| *B29C 67/00* | (2017.01) |
| *B28B 1/00* | (2006.01) |
| *B28B 17/00* | (2006.01) |
| *B29C 64/386* | (2017.01) |
| *B29C 64/393* | (2017.01) |
| *B29C 69/00* | (2006.01) |
| *B29C 64/118* | (2017.01) |
| *B29C 64/194* | (2017.01) |
| *B29C 64/188* | (2017.01) |
| *B29C 37/00* | (2006.01) |

(52) U.S. Cl.
CPC ............ *B22F 3/24* (2013.01); *B22F 3/1055* (2013.01); *B28B 1/001* (2013.01); *B28B 17/00* (2013.01); *B28B 17/0081* (2013.01); *B29C 37/0025* (2013.01); *B29C 59/026* (2013.01); *B29C 64/118* (2017.08); *B29C 64/188* (2017.08); *B29C 64/194* (2017.08); *B29C 64/386* (2017.08); *B29C 64/393* (2017.08); *B29C 67/0085* (2013.01); *B29C 67/0088* (2013.01); *B29C 69/001* (2013.01); *B22F 2003/1056* (2013.01); *B22F 2003/1057* (2013.01)

(58) Field of Classification Search
CPC .......... B22F 3/1055; B22F 2003/1057; B28B 1/001; B29C 37/0025; B29C 59/02; B29C 59/026; B29C 64/106; B29C 64/112; B29C 64/118; B29C 64/188; B29C 64/194; B29C 64/386; B29C 64/393; B29C 69/001

See application file for complete search history.

(56) References Cited

U.S. PATENT DOCUMENTS

| | | | | |
|---|---|---|---|---|
| 2004/0099983 | A1* | 5/2004 | Dirscherl | B22F 3/008 264/162 |
| 2011/0049739 | A1* | 3/2011 | Uckelmann | A61C 13/0013 264/16 |

OTHER PUBLICATIONS

EggBot, Product information [online] Bruce Shapiro and Evil Mad Scientist Laboratories, 2014. [retrieved on Sep. 10, 2015] http://egg-bot.com/, 2pages.
Solidscape 3D printers, Product Information [online] Solidscape Inc, 2015. [retrieved on Sep. 10, 2015] http://www.solid-scape.com/products/3d-printers/, 8 pages.

\* cited by examiner

*Primary Examiner* — Leo B Tentoni
(74) *Attorney, Agent, or Firm* — Kilpatrick Townsend & Stockton LLP (57) ABSTRACT

A three dimensional manufacturing apparatus is provided with a construction tool configured to construct an item from a plurality of layers. The apparatus is also provided with a finishing tool configured to perform a finishing operation on at least one of the layers of the plurality of layers during construction of the item. The finishing operation may be performed on an exposed side edge of a layer.

19 Claims, 4 Drawing Sheets

METHOD OF 3D PRINTING WITH FINISHING TOOL

BACKGROUND

Modern manufacturing technology allows many items to be produced on-demand. For example, many items can be produced quickly using three-dimensional printers to build the items layer by layer under computer control. However, in many cases, a user must manually sand, paint, and/or perform other additional processing on a resulting item before the item is ready for final use. Such post-processing may be time-consuming and/or difficult to consistently perform on multiple copies of the item, leading to increased costs and/or user frustration.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include constructing items that are manufactured on demand, such as by three-dimensional (3D) printing, and performing automated finishing operations on the items. Such finishing operations can prepare the items for final use. For example, a finishing operation may include using automated tools for buffing a portion of the item to attain a desired smooth surface texture and/or for applying ink to the item to attain a desired coloring, graphic, or text on the item. The finishing operations may be performed during construction of the item, which can, for example, facilitate ease of access to portions of the item to be subject to the finishing operation and/or reduce a difficulty of ascertaining locations of such portions.

In some examples, a three-dimensional printing/manufacturing apparatus (hereinafter "3D printer") may include a construction head or tool that constructs an object from layers of plastic (or other material). The layers may be assembled one on top of another, with the bottom of one layer supported by the top of an adjacent layer and the side edges of the layers exposed. The 3D printer may also include a finishing head or tool that performs finishing operations on individual layers or sets of adjacent layers, for example, on the exposed sides of the layers. The finishing tool may be operated at the same time as the construction tool and/or during pauses in constructing the layers. For example, the finishing tool may act on a layer while the construction tool is completing the layer, or the finishing tool may act on a completed layer or set of layers, such as before the construction tool forms additional layers.

As an illustrative example, a designer may generate three-dimensional instructions for printing a three-dimensional object. The three-dimensional instructions may be provided to a 3D printer. The 3D printer may be equipped to print a 3D version of the object and to perform a finishing operation as part of the printing of the 3D object. Upon request by the designer (e.g., as part of the three-dimensional instructions), the 3D printer may perform one of many different types of appropriate finishing operations on the 3D object or specific portions of the 3D object. Thus, the 3D object may be printed in a manner that produces the item in a more finalized state and with a reduced or eliminated need to perform further processing on the item prior to the item being ready for final use.

Figure 1:
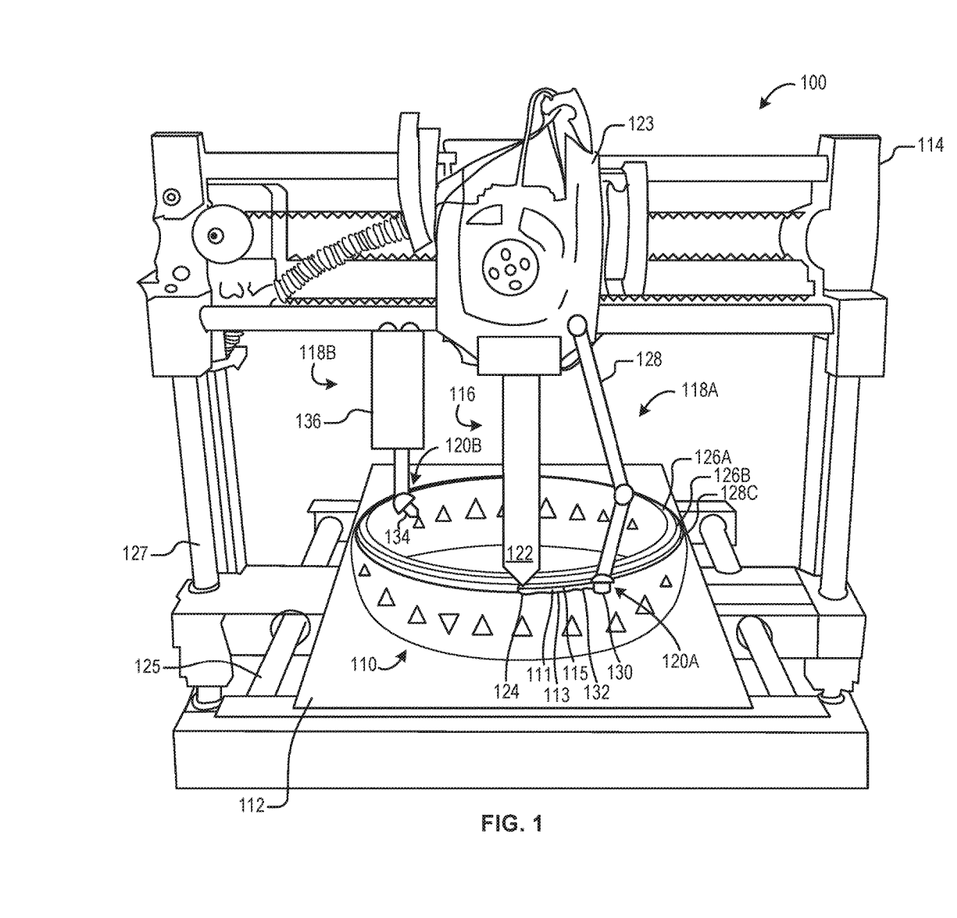
FIG. 1 shows an example system through which one or more items can be created and subjected to finishing operations in accordance with various embodiments.

FIG. 1 shows an example system 100 through which one or more items 110 can be created and subjected to finishing operations. The system 100 includes a manufacturing apparatus 114, e.g., a three-dimensional (3D) manufacturing apparatus. The 3D manufacturing apparatus 114 can produce an item 110 based on 3D manufacturing instructions received for the item 110. The 3D manufacturing instructions may incorporate item construction information (i.e., details about the item that can be used to construct the item from a series of layers) as well as item finishing information (i.e., details about the item that can be used to facilitate performance of finishing operations on one or more of the layers).

The 3D manufacturing apparatus 114 illustrated in FIG. 1 includes a construction tool 116 and one or more finishing tools 118 (individually referenced as first finishing tool 118A and second finishing tool 118B). The construction tool 116 can correspond to any tool that can be used to create the item 110 from a series of layers (e.g., utilizing item construction information incorporated in the 3D manufacturing instructions). In FIG. 1, the construction tool 116 includes a nozzle 122 movable relative to a support surface 112 for the item 110 and operable to deposit material (such as plastic) to build successive layers of the item 110. For example, FIG. 1 illustrates an example layer 124 formed from three abutting lines 126A, 126B, and 126C of plastic that have been deposited by the nozzle 122 on top of a previous layer in building the item 110. The example layer 124 includes an exposed side edge 111 extending between a bottom 113 and a top 115 of the example layer 124 (e.g., from the bottom 113 to the top 115). The bottom 113 of the example layer 124 is supported against the previous layer, and a subsequent layer can be supported on the top 115 of the example layer 124. In this way, the layers can be arranged top to bottom with side edges exposed Additionally, other types of the construction tool 116 may alternatively be used, including, but not limited to, lasers or other light sources operable to cure material to form layers or other tools utilized in methods referenced herein.

The 3D manufacturing apparatus 114 can include any number of finishing tools 118, although in FIG. 1, two are provided. The finishing tools 118 can correspond to any tool that can be used to perform finishing operations on one or more of the layers (e.g., utilizing item finishing information incorporated in the 3D manufacturing instructions). For example, the finishing tools 118 can include any appropriate tips 120 for interacting with material in one or more layers formed by the construction tool 116 so as to modify a characteristic of the material. In FIG. 1, the first finishing tool 118A includes a first tip 120A with a buffing roller 130 that can be brought into contact with a layer to redistribute material of the layer to reduce a number or severity of voids and increase a smoothness characteristic of the surface texture of the material. The second finishing tool 118B shown in FIG. 1 includes a second tip 120B with a pen 134 that can be brought into contact with a layer to apply ink to the layer, such as to change a color characteristic of the layer. However, other types of finishing tools 118 can be used. For example, finishing tools 118 may be used on the material of constructed layers to change a surface characteristic of the constructed material. The finishing tool 118 may change the surface characteristic from a constructed state corresponding to a condition of the surface characteristic when construction of the one or more of the layers of the plurality of layers has been completed by the construction tool 116. Non-limiting examples of finishing operations include, but are not limited to, altering texture (such as buffing, coating, polishing, sanding, sculpting, shaping, molding, grinding, adding differences in texture such as grooves or other surface features, or removing differences in texture), curing (such as to change a color, solubility, hardness, malleability, conductivity, melting point, or other property), changing color (such as by applying a colorant that penetrates or coats a constructed material to change a color, or subjecting the constructed material to a substance, a chemical process, or other process that results in a color change of the material), or applying finishing material (such as applying a lacquer, a colorant, a clear material, a translucent material, an opaque material, a waterproofing or other protective substance, a polishing material or other substance for changing a shine or other surface appearance or property of the material, or another coating). Suitable tips 120 may include, but are not limited to, tips including brushes, sprayers, rollers, pens, foam heads, nozzles, abrasives, cutting edges, rotating elements, vibrating elements, spatulas, lights, lasers, or emitters.

The construction tool 116 and/or the finishing tools 118 can be coupled with any suitable structure to facilitate movement relative to the layers of the item 110. For example, in FIG. 1, the construction tool 116 is coupled with a carriage 123 that provides lateral (e.g., left-right) movement of the nozzle 122 relative to the 3D manufacturing apparatus 114, the support surface 112 is coupled with a rail system 125 that allows the support surface 112 to move axially (e.g., forward and backward), a vertical rail system 127 allows the nozzle 122 to be moved vertically (e.g., up-down), and the combination of these features provides three degrees of freedom of movement of the construction tool 116 relative to the item 110. In alternative embodiments, any of the lateral, axial or vertical movements of the construction tool 116 relative to the item 110 may be provided by either of the carriage 123, support surface 112, or combinations thereof. The finishing tools 118 may include structure that allows motion at least partially independent from the construction tool 116. For example, the first finishing tool 118A shown in FIG. 1 is coupled with a robot arm 128 that provides freedom of motion relative to the carriage 123 and the item 110, while the second finishing tool 118B is shown attached to a carrier 136 that travels laterally independently from the carriage 123. In alternative embodiments, the finishing tools 118 may use the same motion components as the construction tool 116 (e.g., the carriage 123 may carry both and have a mechanism for extending whichever is in use during a particular motion path) or entirely distinct components (such as each having a corresponding robot arm). In various embodiments, a construction tool 116 is movable to construct layers substantially parallel to a reference plane (such as to the support surface 112) and a finishing tool 118 is movable across one or more layers 124 in a direction that is transverse (e.g., perpendicular) to that reference plane or along another angle of attack.

In various embodiments, at least the finishing tools 118 are movable so that the tips 120 can reach or act on exposed side edges of layers (e.g., the exposed side edge 111 of the example layer 124). Depending on the geometry of the layer, the exposed side may correspond to a surface facing at least partially toward a center of the item 110 (e.g., a face along the inner line 126A of material that faces toward an interior of the depicted ring), or the exposed side may correspond to a surface facing at least partially away from a center of the item 110 (e.g., a face along the outer line 126C that faces toward an exterior of the depicted ring). In some embodiments, the tips may additionally or alternatively reach or act on other surfaces than the exposed side edges.

An illustrative example of the operation of the system 100 depicted in FIG. 1 follows. After careful consideration, a person seeking a unique gift for a friend decides to fabricate a replica of a ring referenced in the friend's favorite work of fiction. The person utilizes his or her personal computer to generate a digital model of the ring and send corresponding 3D manufacturing instructions to the 3D manufacturing apparatus 114. In response to construction information incorporated in the 3D manufacturing instructions, the construction tool 116 forms the body of the ring (i.e., the item 110) by extruding melted plastic through the nozzle 122 in a series of layers. For example, at the moment illustrated in FIG. 1, the nozzle 122 is being moved in the leftward direction of FIG. 1 by the carriage 123 so as to form an upper layer 124 of the ring from three abutting lines 126A, 126B, and 126C of plastic that have been deposited on top of the previous layer. The lines 126A, 126B, and 126C have been deposited in successively larger circles in a common plane in the upper layer 124 to form the radial thickness of the ring.

Continuing this illustrative example, in response to finishing information incorporated in the 3D manufacturing instructions, the first finishing tool 118A performs a finishing operation of buffing to provide a smooth surface for the ring. The robot arm 128 of the first finishing tool 118A moves the buffing roller 130 in the leftward direction of FIG. 1 along the upper layer 124 in a path that closely follows the path of the construction tool 116 while forming the upper layer 124. This illustrative finishing operation reduces a visibility of a seam 132 between the upper layer 124 and the previous layer, as may be appreciated by noting the appearance of the seam 132 to the left of the buffing roller 130 in FIG. 1 (where the buffing roller 130 has not yet reached) and non-appearance of the seam 132 to the right of the buffing roller 130 in FIG. 1 (where the buffing roller 130 has already travelled).

Continuing further with this illustrative example, in response to finishing information incorporated in the 3D manufacturing instructions, the second finishing tool 118B performs a finishing operation of applying ink to the ring. The pen 134 of the second finishing tool 118B is moved in combinations of axial, lateral, and/or vertical directions by the carrier 136 so that the pen 134 writes on layers previously constructed by the construction tool 116. For example, the pen 134 may form the illustrated marks on the interior and exterior faces of the ring with heat-sensitive ink so that the writing glows when worn by the ultimate possessor of the ring (e.g., the person for whom the ring is made).

Many features of the system 100 may be appreciated in light of the foregoing illustrative example, and many variations are additionally or alternatively possible. For example, in some aspects, a finishing tool 118 can work on a layer while the layer is being constructed by the construction tool 116 (such as illustrated by the construction tool 116 forming the example layer 124 while the first finishing tool 118A buffs the same layer). In some aspects, a finishing tool may work on one or more layers that have already been completed by the construction tool 116 (such as illustrated by the second finishing tool 118B writing on multiple layers already completed by the construction tool 116). In various aspects, a finishing tool 118 can complete a finishing operation before construction of the item 110 is completed by the construction tool 116.

In various embodiments, the finishing tools 118 and the construction tool 116 can utilize a common reference scheme. For example, the finishing tools 118 may be controlled to perform finishing operations based on information about locations in which the construction tool 116 has constructed layers of the item 110. This may render it unnecessary to include sensors or other features for locating features of the item 110 for performing finishing operations.

In accordance with at least one embodiment, the 3D manufacturing apparatus 114 may include a 3D printer or some other 3D or multi-dimensional manufacturing apparatus(es) 114 described herein. As may be appreciated, the term "manufacture" connotes production of a physical object. The 3D manufacturing apparatus 114 may utilize any manufacturing technique that can be used to produce a three-dimensional physical object based on the 3D manufacturing instructions. Both additive and subtractive manufacturing processes can be utilized individually or in combination. For example, manufacturing techniques can include fused filament fabrication, electron beam freeform fabrication, direct metal laser sintering, electron beam melting, selective laser melting, selective heat sintering, selective laser sintering, laminated object manufacturing, stereo lithography, digital light processing, and any 3D printing, including plaster-based, powder bed, and inkjet head 3D printing. Manufacturing techniques may also include automation of machine tools based on a digital model such as in computer numerical control (or CNC) techniques. Combinations of such techniques may also be employed, such as 3D printing an item to include supports under a suspended portion and cutting away the supports with an automated tool after the suspended portion has cured sufficiently to obviate the supports.

The 3D manufacturing instructions can include any type of data and/or instructions that can be used by a 3D manufacturing apparatus 114 to make an item. The 3D manufacturing instructions can include any data or instructions utilized in producing a physical object based on a digital model or data of the object. In one example, 3D manufacturing instructions may include combinations of dimensions, tolerances, and/or other part specifications that sufficiently describe the attributes of an item such that the item can be physically produced by a 3D manufacturing apparatus 114. In another example, 3D manufacturing instructions may include digital models such as may be provided by Computer-Aided-Design (CAD) files or files for computer modeling programs. In another example, 3D manufacturing instructions may include files in formats such as STL (alternatively referred to as STereoLithography, Standard Triangle Language, and/or Standard Tessellation Language), PLY (alternatively referred to as Polygon File Format and/or Stanford Triangle Format), or VRML (alternatively referred to as Virtual Reality Modeling Language and/or Virtual Reality Markup Language), to name a few. In another example, 3D manufacturing instructions may also include files representing cross sections of digital models referenced for building physical models one layer at a time. In another example, 3D manufacturing instructions may also include executable code providing specific sequential instructions for controlling a 3D manufacturing apparatus 114 to produce a physical object.

In some embodiments, the item construction information and the item finishing information can be synthesized together in the 3D manufacturing instructions. As illustrative examples, the 3D manufacturing instructions may be a single virtual model representing the finishing operation incorporated into the item 110 or an executable code providing sequential instructions for making the item 110 with the finishing operation included.

System Architecture

Figure 2:
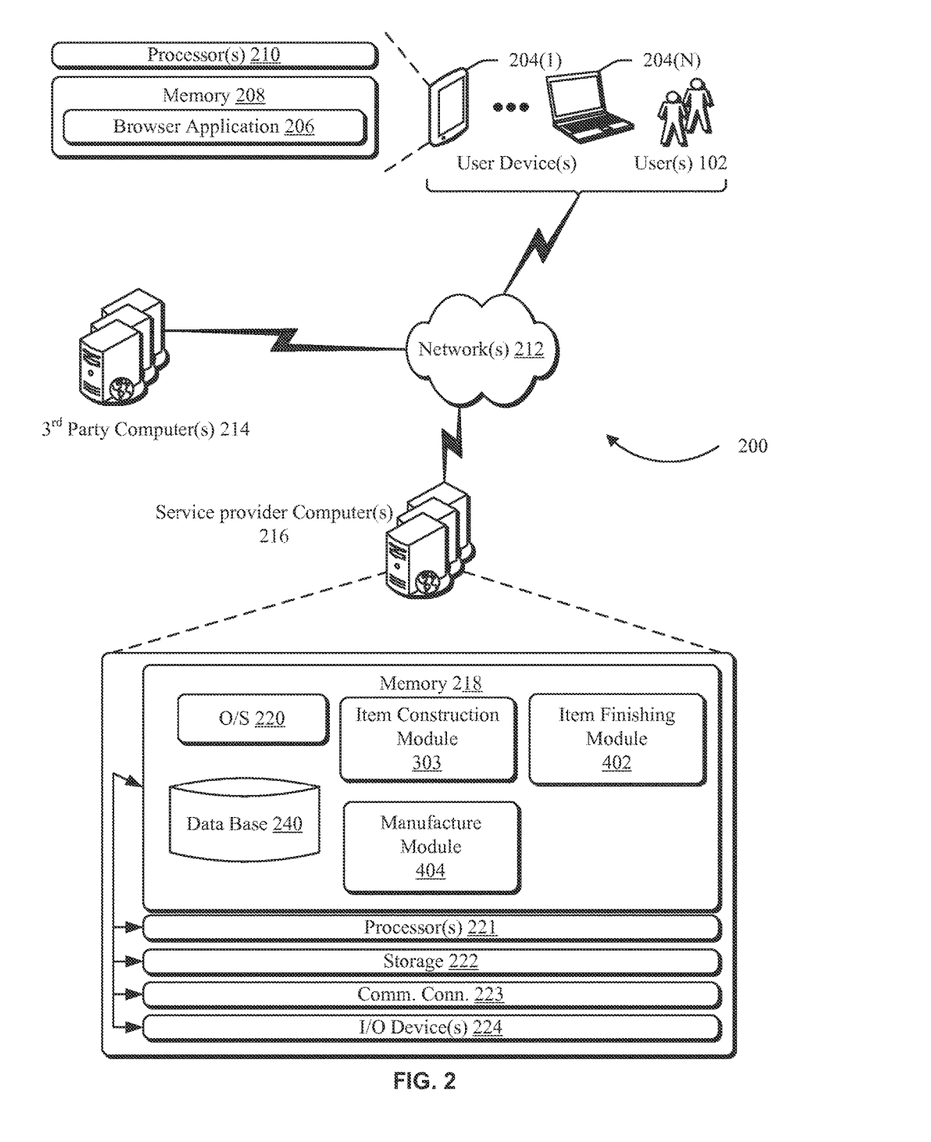
FIG. 2 is a schematic diagram depicting an illustrative system or architecture in which various embodiments can be implemented.

FIG. 2 depicts an illustrative system or architecture 200 in which techniques for incorporating finishing operations into construction of items 110 may be implemented. In architecture 200, one or more users 102 may utilize user computing devices 204(1)-(N) (collectively, user devices 204) to access a browser application 206 (e.g., a web browser) or a user interface (UI) accessible through the browser application 206, via one or more networks 212. The "browser application" 206 can be any browser control or native application that can access and display a network page or other information. In some aspects, the browser application 206 may be hosted, managed, and/or provided by a computing resources service or service provider, such as by utilizing one or more service provider computers 216. The one or more service provider computers 216 may, in some examples, provide computing resources such as, but not limited to, client entities, low latency data storage, durable data storage, data access, management, virtualization, hosted-computing-system-based software solutions, electronic content performance management, etc. The one or more service provider computers 216 may also be operable to provide web or network hosting, computer application development, and/or implementation platforms, combinations of the foregoing, or the like to the one or more users 102.

In one illustrative configuration, the user devices 204 may include at least one memory 208 and one or more processing units or processor(s) 210. The processor(s) 210 may be implemented as appropriate in hardware, computer-executable instructions, firmware, or combinations thereof. Computer-executable instruction or firmware implementations of the processor(s) 210 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 208 may store program instructions that are loadable and executable on the processor(s) 210, as well as data generated during the execution of these programs. Depending on the configuration and type of user device 204, the memory 208 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 208 may include multiple different types of memory, such as static random access memory (SRAM), dynamic random access memory (DRAM), or ROM.

Turning to the components of the memory 208 in more detail, the memory 208 may include an operating system and one or more application programs or services for implementing the features disclosed herein via the browser application 206 or dedicated applications (e.g., smart phone applications, tablet applications, etc.). The browser application 206 may be configured to receive, store, and/or display a website, a link to an electronic marketplace, or other interface for interacting with the one or more service provider computers 216. An electronic marketplace can be a virtual market for buyers and sellers implemented through a network. An electronic marketplace can provide an interface for sellers such that a plurality of sellers can provide items to be listed for consumption in the virtual market. An electronic marketplace can also provide an interface for buyers such that buyers may select and order from among the listed items. Additionally, the memory 208 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user provided response to a security question or a geographic location obtained by the user device 204.

In some examples, the networks 212 may include any one or a combination of many different types of networks, such as cable networks, the Internet, wireless networks, cellular networks and other private and/or public networks. While the illustrated example represents users accessing the browser application 206 over the networks 212, the described techniques may equally apply in instances where the users interact with the one or more service provider computers 216 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The browser application 206 may allow the users to interact with the one or more service provider computers 216, such as to access content like webpages or network pages. The one or more service provider computers 216, perhaps arranged in a cluster of servers or as a server farm, may host the browser application 206 and/or cloud-based software services. Other server architectures may also be used to host the browser application 206 and/or cloud-based software services. The browser application 206 may be capable of handling requests from many users and serving, in response, various user interfaces that can be rendered at the user devices 204 such as, but not limited to, a webpage, a website, network site, or network page. The browser application 206 can interact with any type of website or network site that supports user interaction, including social networking sites, electronic retailers, informational sites, blog sites, search engine sites, news and entertainment sites, and so forth. The described techniques can similarly be implemented outside of the browser application 206, such as with other applications running on the user device 204.

The one or more service provider computers 216 may be any type of computing device such as, but not limited to, a mobile phone, a smart phone, a personal digital assistant (PDA), a laptop computer, a desktop computer, a server computer, electronic book (e-book) reader, a thin-client device, a tablet PC, etc. Additionally, it should be noted that in some embodiments, the one or more service provider computers 216 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the one or more service provider computers 216 may be in communication with the user device 204 via the networks 212, or via other network connections. The one or more service provider computers 216 may include one or more servers, perhaps arranged in a cluster or as individual servers not associated with one another. The one or more service provider computers 216 may be in communication with one or more third party computers 214 via networks 212. The one or more service provider computers 216 that host the browser application 206 may obtain and provide data to third party computers 214 via networks 212 in accordance with embodiments described herein.

In one illustrative configuration, the one or more service provider computers 216 may include at least one memory 218 and one or more processing units or processors(s) 221. The processor(s) 221 may be implemented as appropriate in hardware, computer-executable instructions, firmware, or combinations thereof. Computer-executable instruction or firmware implementations of the processor(s) 221 may include computer-executable or machine-executable instructions written in any suitable programming language to perform the various functions described. The memory 218 may store program instructions that are loadable and executable on the processor(s) 221, as well as data generated during the execution of these programs. Depending on the configuration and type of the one or more service provider computers 216, the memory 218 may be volatile (such as RAM) and/or non-volatile (such as ROM, flash memory, etc.). The one or more service provider computers 216 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 222, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 222 are all examples of computer storage media. Additional types of computer storage media that may be present in the one or more service provider computers 216 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium, which can be used to store the desired information and which can be accessed by the one or more service provider computers 216. Combinations of any of the above should also be included within the scope of computer-readable media.

The one or more service provider computers 216 may also contain communication connection(s) 223 that allow the one or more service provider computers 216 to communicate with a stored database, another computing device or server, user terminals and/or other devices on the networks 212. The one or more service provider computers 216 may also include I/O device(s) 224, such as a keyboard, a mouse, a pen, a voice input device, a touch input device, a display, speakers, a printer, etc.

Turning to the contents of the memory 218 in more detail, the memory 218 may include an operating system 220, one or more data stores 240 and/or one or more application programs, services, or other software modules, which are generally executed by a processor (e.g., the processors 210 and/or 221) for implementing the features disclosed herein.

Example modules are shown in FIG. 2, but functions and embodiments described herein can utilize a subset of the features provided by the modules and/or additional functions can be provided. Additionally, while the example modules will now be briefly discussed with regard to FIG. 2, further specific details regarding the example modules are provided below in the descriptions of subsequent Figures.

As an example module of memory 218, an item construction module 303 can be provided for receiving and/or processing orders for items. The item construction module 303 may also access, generate, or obtain any item construction information about how an item is to be constructed from a series of layers. The item construction module 303 may also determine whether an ordered item is to be subject to any finishing operations. An item finishing module 402 may further be provided for obtaining and/or providing information related to finishing operations to be performed on a requested item 110. A manufacture module 404 can be provided for providing and/or generating instructions, for example the 3D manufacturing instructions to the 3D manufacturing apparatus 114, which may be based at least in part on information accessed by the item construction module 303 and/or item finishing module 402.

Appropriate intermediary operations may be implemented to transfer the item 110 to an intended recipient from whatever entity controls the 3D manufacturing apparatus 114. For example, an item 110 produced to fulfill an order of a user 102 may be produced on a manufacturing apparatus 114 controlled by the service provider and may be delivered to the user 102 based on delivery information provided by the user via truck delivery or any suitable delivery method, including standard mail, air mail, truck, aerial drone, or deposit at a designated pick-up location. In some embodiments, the order may be fulfilled by providing manufacturing instructions that a user 102 may use with a personal manufacturing apparatus 114 to produce an item 110.

As can be understood, the 3D manufacturing instructions and/or information associated therewith (such as item construction information and/or item finishing information) may be obtained and stored well prior to receipt of orders from users 102, so that the 3D manufacturing instructions and/or associated information are available when an order is placed. Moreover, the item construction module 303, the item finishing module 402, and/or the manufacture module 404 may also access any related item construction information, item finishing information, and/or 3D manufacturing instructions, from any appropriate direct or intermediary source including user devices 204, $3^{rd}$ party computers 214, memory 218, database 240, and/or 3D manufacturing apparatus 114.

Figure 3:
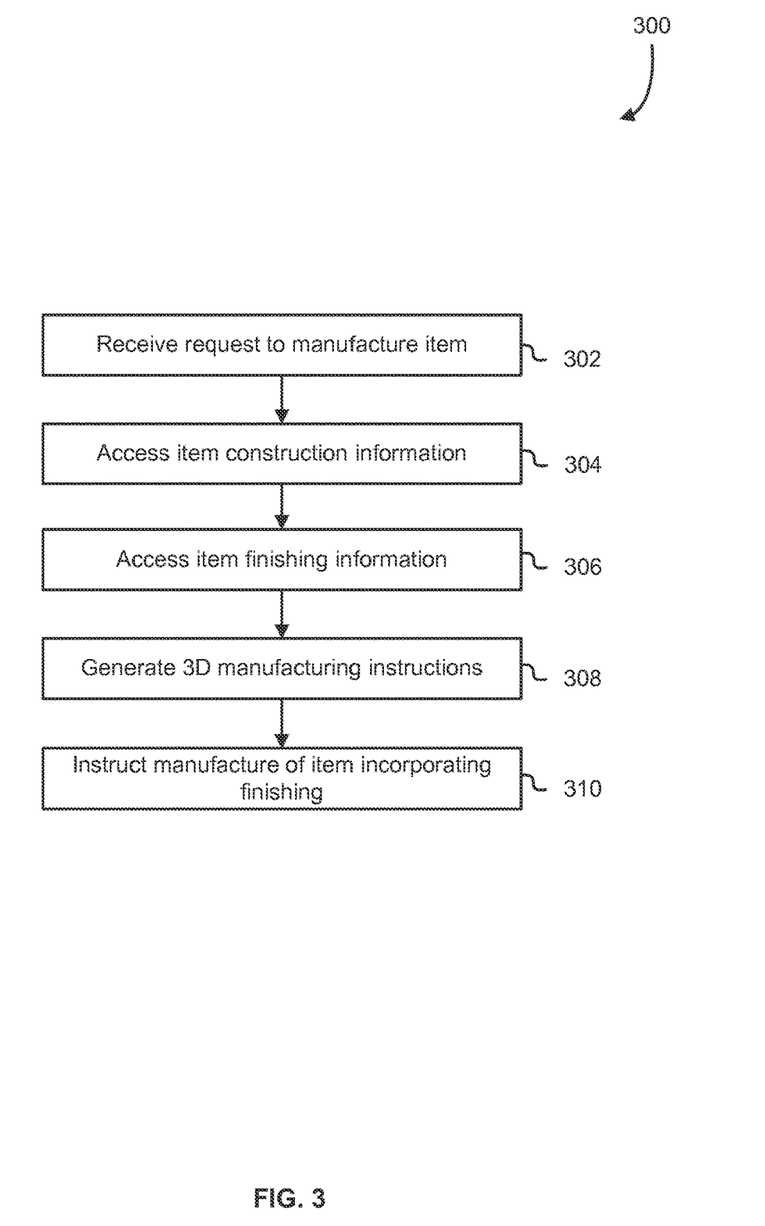
FIG. 3 is a flow chart representing a process for producing an item with finishing incorporated in accordance with various embodiments.

FIG. 3 is a flow chart representing an example process 300 for producing items 110 with finishing incorporated in accordance with some embodiments. Some or all of the process 300 (or any other processes described herein, or variations and/or combinations thereof) may be performed under the control of one or more computer systems configured with executable instructions, such as the modules described herein, and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory. Moreover, unless indicated otherwise, acts shown in the processes are not necessary performed in the order shown, and/or some acts can be omitted in embodiments.

The process 300 includes at 302 receiving a request to manufacture an item with a 3D manufacturing apparatus. For example, a user 102 may submit an order to a computer 216 of a service provider, and/or request that manufacturing instructions be sent to a manufacturing apparatus 114 to make an item 110. At 304, item construction information can be accessed. At 306, item finishing information can be accessed. For example, the item construction information and/or the item finishing information may be accessed from memory, or a third party, as previously described. In some aspects, the item finishing information can include information (e.g., received as input submitted by a user) about a portion of the item that is to be subject to the finishing operation. For example, briefly referring to the illustrative example described with respect to FIG. 1, the user may indicate that only top and bottom regions of the ring 110 are to be buffed, e.g., in order to reduce a complexity of the finishing operation and obtain a corresponding amount of time savings in the overall time expended in producing the item 110 with the finishing incorporated (effectively trading time for quality). In some aspects, the item finishing information can include other parameters that can affect an extent of finishing operations performed (such as a time delay between completing construction of a layer and initiating a finishing operation for the layer, and/or a number of layers to create between finishing operations). At 308, 3D manufacturing instructions can be generated. For example, the 3D manufacturing instructions may be based on the accessed item finishing information and the item construction information, as previously described. At 310, manufacture of the item with a finishing operation incorporated can be instructed. For example, the item may be subject to any finishing operation previously described herein. In various aspects, the finishing operation is performed on an exposed edge of a constructed layer. In some aspects, the finishing operation is performed prior to completion of a final layer of the item.

Figure 4:
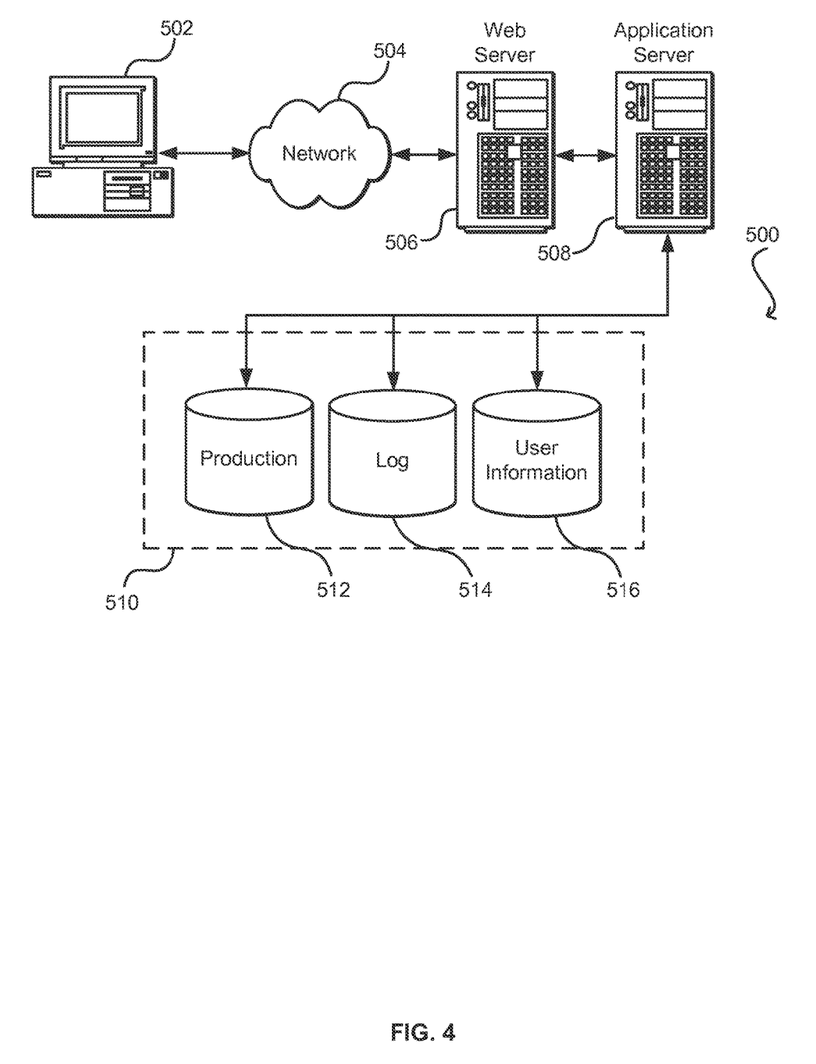
FIG. 4 illustrates an environment in which various embodiments can be implemented.

FIG. 4 illustrates aspects of an example environment 500 for implementing aspects in accordance with various embodiments. As will be appreciated, although a Web-based environment is used for purposes of explanation, different environments may be used, as appropriate, to implement various embodiments. The environment includes an electronic client device 502, which can include any appropriate device operable to send and receive requests, messages or information over an appropriate network 504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 506 for receiving requests and serving content in response thereto, although for other networks an alternative device serving a similar purpose could be used as would be apparent to one of ordinary skill in the art.

The illustrative environment includes at least one application server 508 and a data store 510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 502 and the application server 508, can be handled by the Web server. It should be understood that the Web and application servers are not required and are merely example components, as structured code discussed herein can be executed on any appropriate device or host machine as discussed elsewhere herein.

The data store 510 can include several separate data tables, databases or other data storage mechanisms and media for storing data relating to a particular aspect. For example, the data store illustrated includes mechanisms for storing production data 512 and user information 516, which can be used to serve content for the production side. The data store also is shown to include a mechanism for storing log data 514, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 510. The data store 510 is operable, through logic associated therewith, to receive instructions from the application server 508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 4. Thus, the depiction of the system 500 in FIG. 4 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers.

The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium, which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method comprising:
controlling, by a computer system, a construction tool of a manufacturing apparatus based on three-dimensional manufacturing instructions for an item so as to create at least one layer of the item, wherein the item comprises a plurality of layers; and
controlling, by the computer system and before completion of the plurality of layers of the item, a finishing tool of the manufacturing apparatus so as to perform a finishing operation on at least a side edge of a respective layer of the plurality of layers, the side edge being exposed between a top and a bottom of the respective layer prior to performance of the finishing operation.

2. The method of claim 1, further comprising controlling the construction tool so as to begin creating one or more other layers of the plurality of layers after the finishing operation is completed.

3. The method of claim 1, wherein the finishing tool and the construction tool are controlled so as to perform the finishing operation during at least one of creation of the at least one layer of the item or creation of one or more other layers of the plurality of layers.

4. The method of claim 1, wherein the finishing operation comprises altering a color of material of the side edge of the respective layer.

5. The method of claim 4, wherein altering a color of material of the side edge of the respective layer comprises applying colorant to the material of the side edge of the respective layer.

6. The method of claim 1, wherein the finishing operation comprises altering a texture of material of the side edge of the respective layer.

7. The method of claim 6, wherein altering a texture of material of the side edge of the first layer comprises buffing or smoothing the material of the side edge of the respective layer.

8. The method of claim 1, wherein the side edge faces toward an exterior of the item.

9. The method of claim 1, wherein the side edge faces toward an interior of the item.

10. A method comprising:
receiving, by a computer system, a request to manufacture a three-dimensional item with a three-dimensional manufacturing apparatus;
accessing item construction information about making the three-dimensional item with the three-dimensional manufacturing apparatus from a plurality of layers including a final layer;
accessing finishing information about a finishing operation designated for performance on the three-dimensional item to be manufactured, the finishing operation comprising changing a surface characteristic of material of a side edge of one or more of the layers of the plurality of layers from a constructed state corresponding to a condition of the surface characteristic when construction of the one or more of the layers of the plurality of layers has been completed according to the item construction information, the side edge being exposed between a top and a bottom of the respective layer prior to performance of the finishing operation;
generating three-dimensional manufacturing instructions, based at least in part on the item construction information and the finishing information; and
instructing the three-dimensional manufacturing apparatus to, based on the three-dimensional manufacturing instructions, manufacture the three-dimensional item with the finishing operation performed at least in part prior to completion of the final layer of the item.

11. The method of claim 10, wherein instructing the three-dimensional manufacturing apparatus comprises providing instructions that cause the item to be constructed from the plurality of layers that are substantially parallel to a reference plane and that cause the finishing operation to include movement of a finishing tool in a direction perpendicular to the reference plane.

12. The method of claim 10, wherein the finishing operation comprises changing a surface characteristic of material of multiple of the layers of the plurality of layers.

13. The method of claim 10, wherein instructing the three-dimensional manufacturing apparatus comprises providing instructions that cause multiple layers to be constructed before performance of the finishing operation on at least some of the multiple layers.

14. The method of claim 10, wherein changing the surface characteristic of the material comprises at least one of changing a texture of the material, changing a color of the material, or applying a finishing material to the material.

15. The method of claim 10, wherein instructing the three-dimensional manufacturing apparatus comprises providing instructions that cause the finishing operation to be performed during construction of at least one layer of the item.

16. A method comprising:
receiving, by a computer system, a request to manufacture a three-dimensional item with a three-dimensional manufacturing apparatus;
accessing item construction information about making the three-dimensional item with the three-dimensional manufacturing apparatus from a plurality of layers including a final layer;
accessing finishing information about a finishing operation designated for performance on the three-dimensional item to be manufactured, the finishing operation comprising changing a surface characteristic of material of one or more of the layers of the plurality of layers from a constructed state corresponding to a condition of the surface characteristic when construction of the one or more of the layers of the plurality of layers has been completed according to the item construction information;
generating three-dimensional manufacturing instructions, based at least in part on the item construction information and the finishing information;
instructing the three-dimensional manufacturing apparatus to, based on the three-dimensional manufacturing instructions, manufacture the three-dimensional item with the finishing operation performed at least in part prior to completion of the final layer of the item;
controlling, by the computer system, a construction tool of the three-dimensional manufacturing apparatus based on the three-dimensional manufacturing instructions generated for the three-dimensional item so as to create at least one layer from the plurality of layers of the three-dimensional item; and
controlling, by the computer system and before completion of the plurality of layers of the three-dimensional item, a finishing tool of the manufacturing apparatus so as to perform a finishing operation on at least a side edge of a respective layer of the plurality of layers, the side edge being exposed between a top and a bottom of the respective layer prior to performance of the finishing operation.

17. The method of claim 16, wherein the side edge faces away from a center of the three-dimensional item.

18. The method of claim 16, wherein the side edge faces toward a center of the three-dimensional item.

19. The method of claim 16, wherein the finishing tool comprises:
   a first finishing tool configured to perform a first finishing operation of buffing the side edge; and
   a second finishing tool configured to perform a second finishing operation of applying finishing material to the side edge; the finishing material including at least one of a colorant substance; a waterproofing or other protective substance, or a substance for changing a shine or other surface appearance of the respective side edge.

* * * * *

UNITED STATES PATENT AND TRADEMARK OFFICE
CERTIFICATE OF CORRECTION

PATENT NO. : 10,195,666 B1
APPLICATION NO. : 14/853847
DATED : February 5, 2019
INVENTOR(S) : Barnet et al.

Page 1 of 1

It is certified that error appears in the above-identified patent and that said Letters Patent is hereby corrected as shown below:

In the Claims

Column 17, Lines 14-15, Claim 19:
Delete: "side edge; the finishing material including at least one of a colorant substance; a waterproofing or other protective"
Insert: --side edge, the finishing material including at least one of a colorant substance, a waterproofing or other protective--

Signed and Sealed this
Thirteenth Day of August, 2019

Andrei Iancu
*Director of the United States Patent and Trademark Office*